United States Patent [19]

Dupraz et al.

[11] Patent Number: 5,073,747
[45] Date of Patent: Dec. 17, 1991

[54] FEEDBACK SYSTEM CONTROL DEVICE AND APPLICATIONS IN AMPLIFIERS AND SERVOMECHANISMS

[75] Inventors: Jean-Pierre Dupraz, Lyons; Jean-Paul Moncorge, Vaux en Velin, both of France

[73] Assignee: GEC Alsthom SA, Paris, France

[21] Appl. No.: 574,724

[22] Filed: Aug. 30, 1990

[30] Foreign Application Priority Data

Aug. 30, 1989 [FR] France .................. 89 11386

[51] Int. Cl.$^5$ .................. G05B 13/00
[52] U.S. Cl. .................. 318/561; 318/621; 318/632; 318/609; 364/165; 364/164; 330/151
[58] Field of Search .......... 318/561, 621, 632, 609, 318/610; 364/165, 164; 330/151

[56] References Cited

U.S. PATENT DOCUMENTS

| 4,341,986 | 7/1982 | Browder | 318/618 |
| 4,885,676 | 12/1989 | Zweighaft | 364/178 |
| 4,904,912 | 2/1990 | Yamamoto | 318/561 |
| 4,914,365 | 4/1990 | Murakami et al. | 318/609 |

FOREIGN PATENT DOCUMENTS

0180292 5/1986 European Pat. Off. .
2013374 8/1979 United Kingdom .

OTHER PUBLICATIONS

Patent Abstracts of Japan, vol. 8, No. 6 (P-247)[1443], Jan. 12, 1984; & JP-A-58 169 202 (Yamatake Honeywell K.K.), 10/5/1983.

*Primary Examiner*—William M. Shoop, Jr.
*Assistant Examiner*—Saul M. Bergmann
*Attorney, Agent, or Firm*—Sughrue, Mion, Zinn Macpeak & Seas

[57] ABSTRACT

A feedback system control device includes an adder producing a control signal from a feed forward signal and a correction signal. A system which processes the control signal drives the feedback system, which produces an output signal. A feed forward circuit, e.g., a four-pole network, receives the input signal and produces the feed forward signal. An error amplifier in the corrector processes the difference between the input signal and the output signal to produce an error signal. A corrector produces the correction signal from an input signal and this error signal. Two processors in the corrector each receive the error signal and produce respective modification signals between which there is a relative phase shift. An adder sums the modification signals to produce the correction signal.

16 Claims, 4 Drawing Sheets

5,073,747

FEEDBACK SYSTEM CONTROL DEVICE AND APPLICATIONS IN AMPLIFIERS AND SERVOMECHANISMS

BACKGROUND OF THE INVENTION

1. Field of the invention

The present invention concerns a control device for a feedback system such as an amplifier or a servomechanism.

2. Description of the Prior Art

Devices of this kind comprising at least one feedback loop suffer from stability defects due to phase differences introduced by the forward path and the feedback loop. This is the case with amplifiers incorporating an output transformer, for example, where oscillations can occur with a capacitive load, or with class D amplifiers whose switching mode operation entails filtering using inductors and capacitors. If the phase shift at a specific frequency reaches 360° the system oscillates. This limits the usable amount of feedback (which directly influences accuracy) and the bandwith. The system must meet particular known requirements and specifically the Nyquist criterion.

One aim of the invention is to provide a feedback system control device conferring high accuracy without compromising stability.

SUMMARY OF THE INVENTION

The present invention consists in a feedback system control device comprising an adder adapted to produce a control signal from a feed forward signal and a correction signal, a system for processing said control signal and driving said feedback system which is adapted to produce an output signal, an error amplifier adapted to process the difference between an input signal and said output signal and to produce an error signal a four-pole network as a feed-forward circuit adapted to receive said input signal and to produce said feed forward signal, corrector adapted to produce said correction signal from said error signal said corrector comprising two processors each adapted to receive said error signal and to produce respective modification signals between which there is a relative phase shift, and a summing circuit in each processor adapted to sum said modification signals to produce said correction signal.

In a first embodiment the four-pole network delivers a feed forward signal identical to the input signal.

In a second embodiment the four-pole network is a high-pass filter.

The corrector in the feedback system control device comprises a selective amplifier behind said error amplifier to produce said error signal, followed by said processors each receiving the error signal and generating modification signals with a phase shift between them and an adder summing the two modification signals to deliver the correction signal.

At least one of the processors in the feedback system control device includes a phase-shifter which receives the feed forward signal and produces a phase-shifted signal, an error extractor which receives this phase-shifted signal and the error signal and produces an extraction signal and an amplifier receiving this extraction signal followed by a multiplier forming the product of this phase-shifted signal and the output signal of the amplifier and supplying the modification signal.

At least one of the processors in the feedback system control device includes a phase-shifter which receives the input signal and produces a phase-shifted signal, an error extractor which receives this phase-shifted signal and the error signal and produces an extraction signal and an amplifier receiving this extraction signal followed by a multiplier producing the product of this phase-shifted signal and the output signal of the amplifier and supplying the modification signal.

In a first embodiment, the error extractor is an analog multiplier, the extraction signal being the product of the phase-shifted signal and the error signal.

In a second embodiment the error extractor comprises a signal shaper which receives the phase-shifted signal to produce a squarewave signal and a synchronous detector whose logic input is the squarewave signal and whose analog input is the error signal from which the extraction signal is produced.

The amplifier of at least one processor of the feedback system control device is advantageously an integrator.

In one embodiment of the feedback system control device the amplifier of at least one processor comprises a low-pass filter followed by an amplifier.

In the feedback system control device the multiplier comprises a chopper and a low-pass filter.

In a first option, both processors in the feedback system control device include a phase-shifter, the phase shifts generated by the two phase-shifters being different.

In a second option one processor in the feedback system control device has no phase-shifter and the other applies a phase-shift of 90°.

Finally, the adder which produces the error signal and the summing circuit which produces the correction signal are combined in a three-input adder.

The invention finds applications in controlling an amplifier or a servomechanism, for example.

The object and characteristics of the invention will emerge in more detail from the following description of embodiments given by way of non-limiting example with reference to the appended drawings.

DETAILED DESCRIPTION OF THE INVENTION

Entities included in more than one drawing always have the same reference number.

Figure 1:
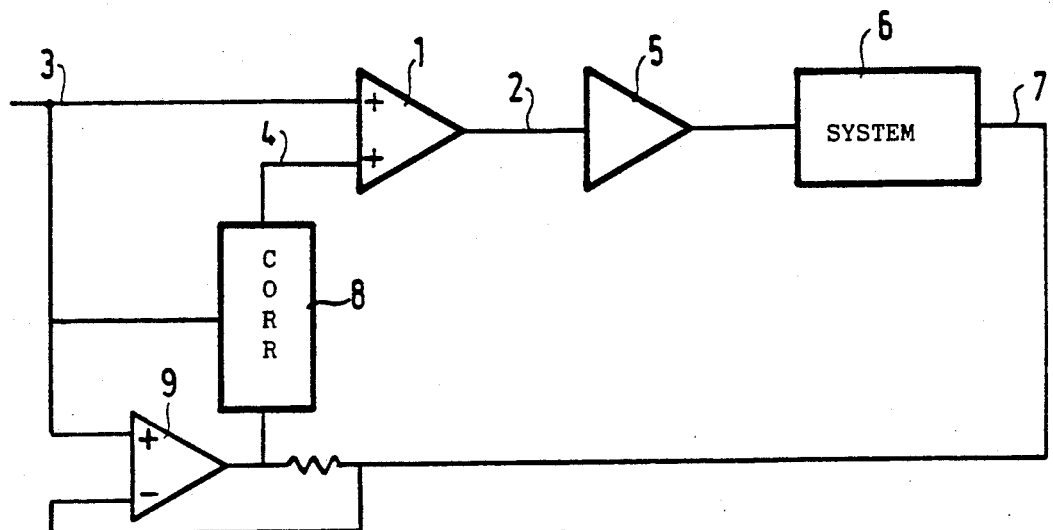
FIG. 1 is a block schematic of a feedback system control device in accordance with the invention.

The control device in accordance with the invention shown in FIG. 1 includes an adder 1 which produces a control signal 2 from an input magnitude 3 and a correction signal 4. The control signal is then fed to an amplifier 5 whose output drives the system 6 to be controlled. This system delivers control information in the form of an output signal 7. The correction signal 4 is produced in a corrector 8 which receives an error signal 10 produced by an error amplifier 8 combines the input signal and the output signal.

The error amplifier 9 produces the error signal 10 which represents the difference between the input signal 3 and the output signal 7. This error signal drives two processors 11, 12 which produce modification signals 13, 14. These two modification signals are then added in a summing circuit 15 the output signal of which is the correction signal 4.

Figure 3:
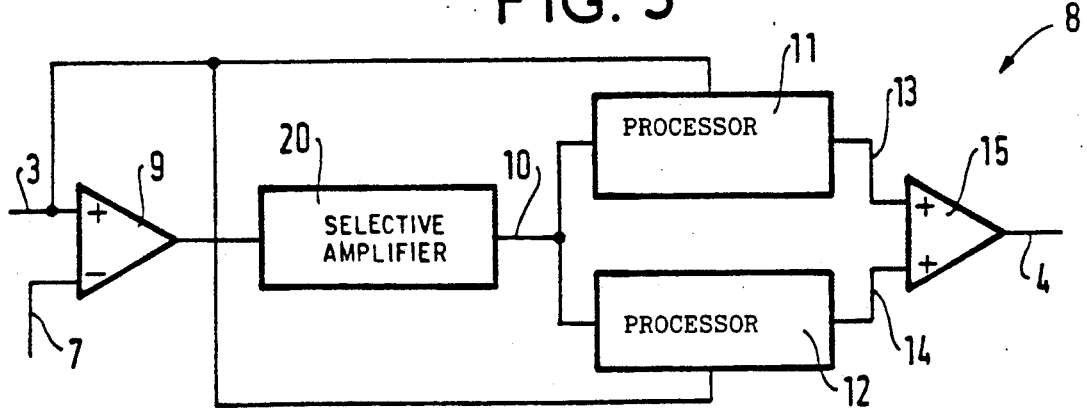
FIG. 3 shows an alternate corrector.

An alternative corrector 8 shown in FIG. 3 also includes a frequency-selective amplifier 20 which receives the output signal from the error amplifier 9 and produces the error signal 10. This frequency-selective amplifier is tuned to the fundamental frequency of the input signal 3 and rejects harmonic frequencies present at the output of the error amplifier 9.

Figure 4:
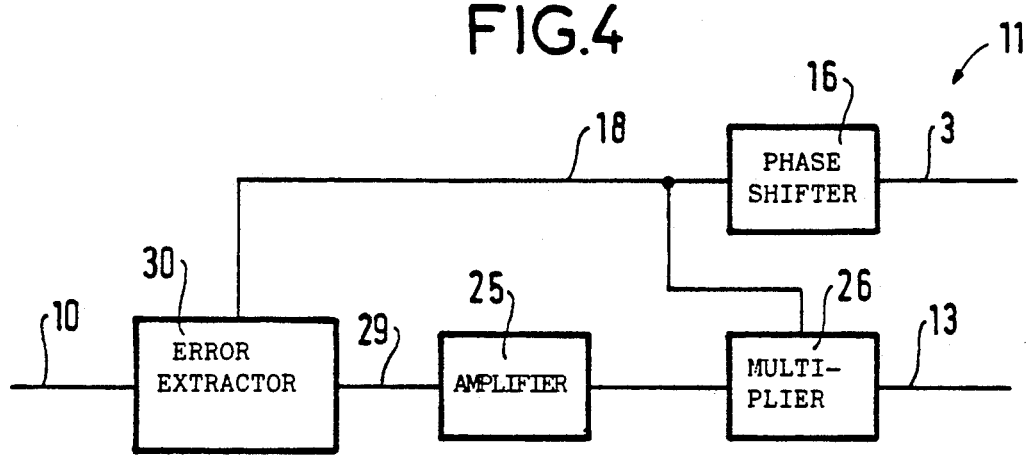
FIG. 4 shows a processor.
Figure 5:
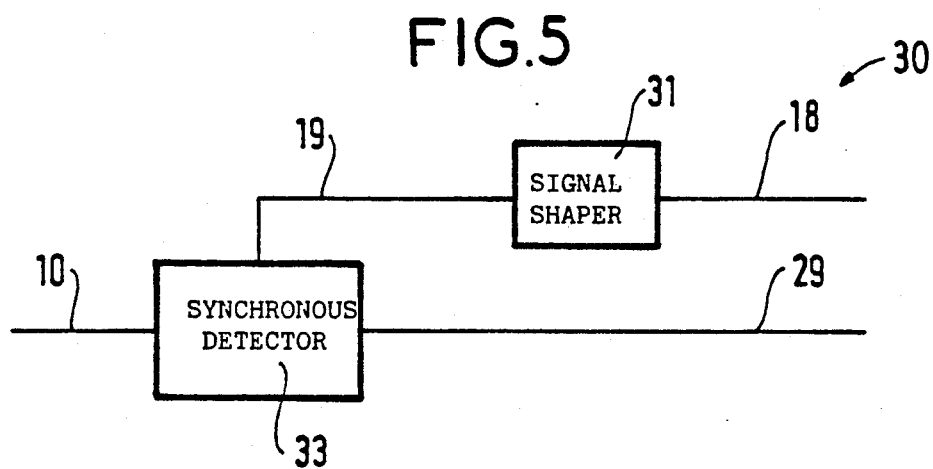
FIG. 5 shows one embodiment of an error extractor.
Figure 6:
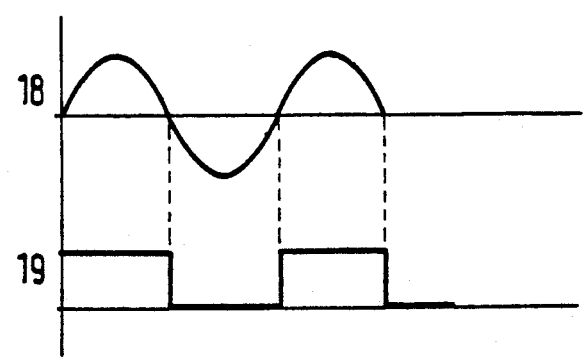
FIG. 6 shows the functioning of a signal shaper.
Figure 7:
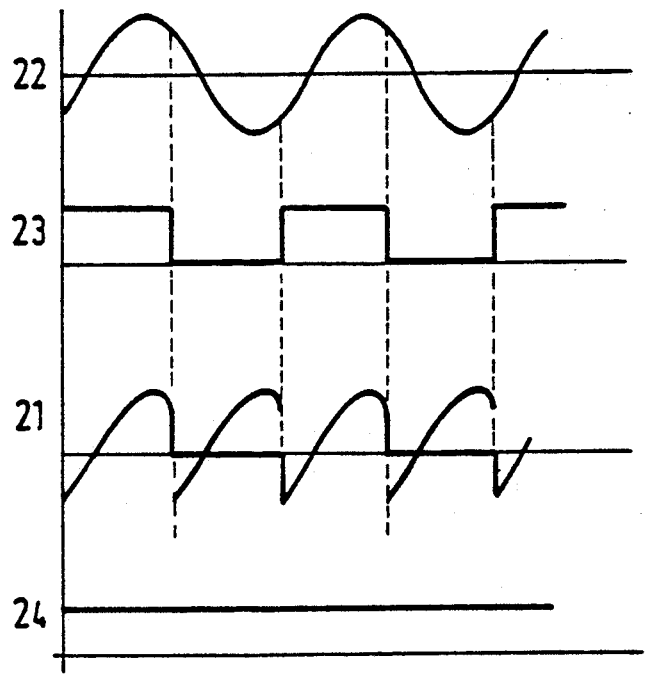
FIG. 7 shows the functioning of a synchronous detector.

The processor shown in FIG. 4 includes a phase-shifter 16 which receives the input signal 3 and delivers a phase-shifted signal to an error extractor 20. The error extractor also receives the error signal 10 and in a first embodiment is an analog multiplier which forms the product of the two signals applied to its inputs; it delivers an extraction signal 29. In a second embodiment shown in FIG. 5, the error extractor 20 includes a signal shaper 31 which produces from a periodic signal 18 a squarewave logic signal 19 with the same period, shown in FIG. 6. This squarewave signal is fed to the logic input of a synchronous detector 33. The function of this detector is symbolically represented in FIG. 7. The detector has a logic input and an analog input and delivers at its output the signal 22 applied to the analog input if the logic input 23 is activated or the complement of the signal 22 if this input is not activated. The average value 24 of the output signal 21 if the input signal 22 is sinusoidal and if the signal applied to the logic input is at the same frequency is therefore proportional to the cosine of the phase-shift between these two signals.

The error signal 10 is applied to the analog input of the synchronous detector 33, the output from this detector being fed to an amplifier 25.

In one embodiment this amplifier is an integrator. In another embodiment it is a high-gain amplifier and includes a low-pass filter. In both cases the time constants are chosen to be very much greater than the period of the input signal 3.

Finally, this processor includes a multiplier 26 which forms the product of the phase-shifted signal 18 from the phase-shifter 16 and the output signal from the amplifier 25; the result is a modification signal 13, 14.

Figure 8:
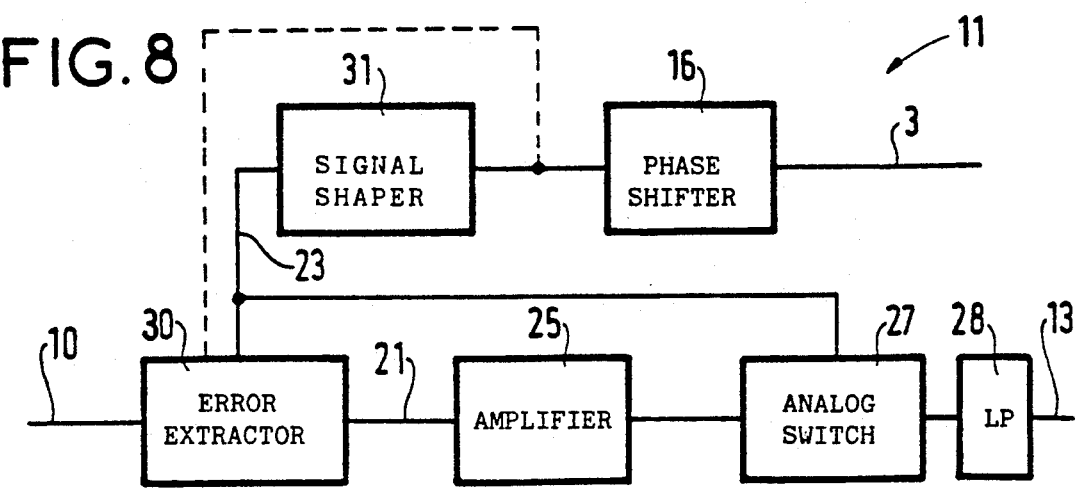
FIG. 8 shows an alternate processor.

In the embodiment of the processor shown in figure 8, the multiplier is replaced by a chopper. In this figure the dashed line between the phase-shifter 16 and the error extractor 30 represents the case where the latter is an analog multiplier, the full line linking the signal shaper 31 to the error extractor representing the case where the latter is a synchronous detector. The chopper includes an analog switch 27 which has a logic input and an analog input and which transfers to its output the signal applied to its analog input if its logic input is activated or nothing otherwise. The output signal from the amplifier 25 is applied to the analog input and the output signal from the signal shaper 17 is fed to its logic input. A low-pass filter 28 is provided at the output of this analog switch 27 to eliminate the DC component and the harmonic frequencies and retain only the fundamental frequency of the output signal from the signal shaper 31.

In one specific embodiment, the first processor is as described above and its phase-shifter introduces a phase-shift of 90°, for example, the second processor being identical except that it does not include any phase-shifter. More generally, use may be made of two processors each including a phase-shifter, producing different phase-shifts.

It is therefore clear that the control device can apply vector correction by adding to the input signal 3 two modification signals 13, 14 which operate on the phase and the amplitude of the control signal 2.

Figure 2:
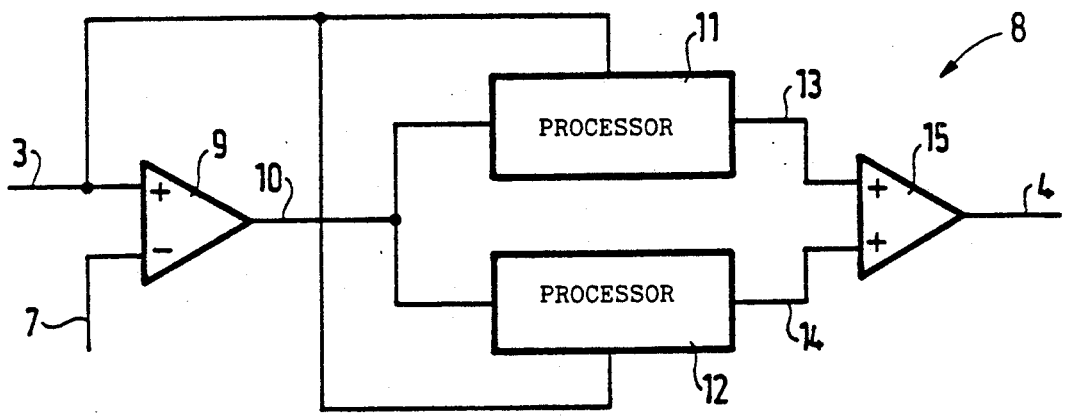
FIG. 2 shows a corrector.

The adders 1 (FIG. 1) and 15 (FIG. 2) are shown as two separate units to clarify the explanation but can obviously be combined into a single unit with three inputs.

The various component parts of the device now having been described, its operation will be described in more detail.

When the device is switched on there is no correction signal 4 and the input signal 3 is therefore present at the input of the amplifier 5. The system 6 to be controlled generates an output signal 7. The error amplifier 9 generates an error signal 10 which is applied after optional filtering to each processor 11, 12.

In each processor the voltage at the output of the amplifier 25 varies with the error signal. This voltage is applied to the multiplier 26 to correct the input signal, reducing the magnitude of the error signal. If the amplifier 25 is an integrator its output moves more and more slowly towards an equilibrium value representing a null error. If the amplifier includes a low-pass filter the error is not eliminated but proportional to the reciprocal of the gain of the amplifier, which can be chosen to be sufficiently high for the error to be within the specifications of the device.

If a change occurs in the system 6 to be controlled (a variation in the load in the case of an amplifier, for example), the processor reacts in the way described above.

The considerations in respect of one processor apply to the other and the combination of the two processors therefore makes it possible to eliminate or reduce to a satisfactory degree both components of the error signal. The stated objective is therefore achieved.

It is important to note that the sensitive element of the control device is the amplifier 9. It is the accuracy of this component which determines the accuracy of the control device as the errors due to the other components, especially the multipliers and the phaseshifters, are compensated by the loop. In particular, phase rotations caused by the frequency-selective amplifier 20 have no effect.

The system 6 may be a servo mechanism or a servo amplifiers, in particular amplifiers used to protect and monitor electrical power distribution networks. Amplifiers of this kind have a very high power gain and amplify a signal of a few mW produced by capacitive dividers to a level of 50 or 100 VA. They have a protective function and must therefore combine 3% accuracy with high speed. They also have a measurement function which requires 0.2% accuracy over a long integration period.

The device will also find applications in control systems such as servomechanisms.

Figure 9:
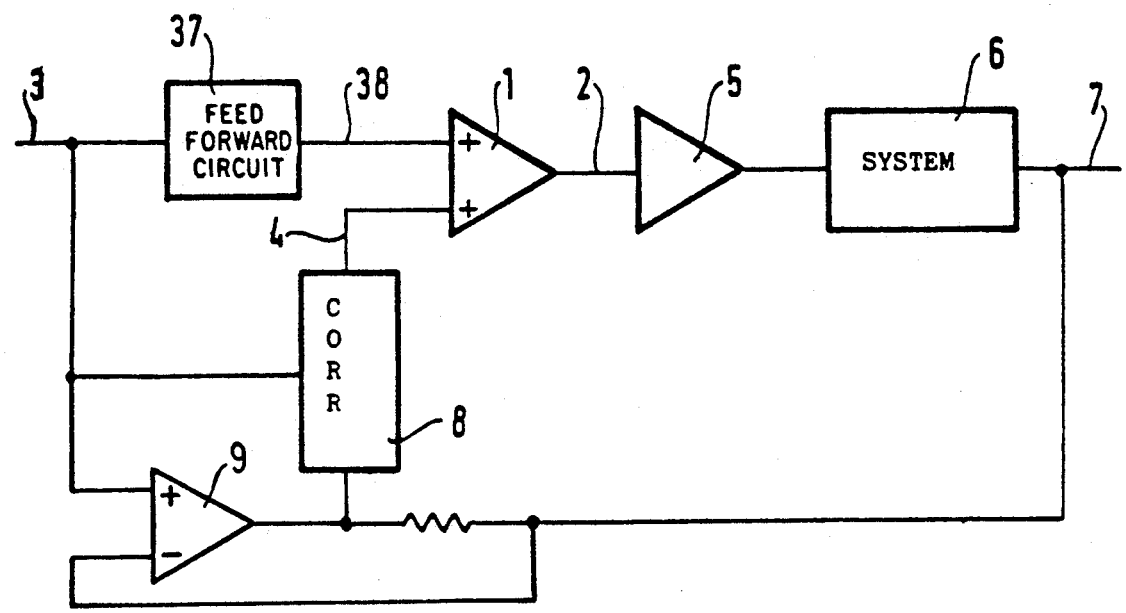
FIG. 9 shows one embodiment of a feedback system

In one embodiment of the feedback system control device all the considerations discussed above apply. This device further comprises a feed forward circuit 37, e.g. a four-pole network such as a filter which receives the input signal 3. In a first embodiment shown in FIG. 9, this filter produces an output signal which is applied to the adder 1 in place of the input signal 3.

Figure 10:
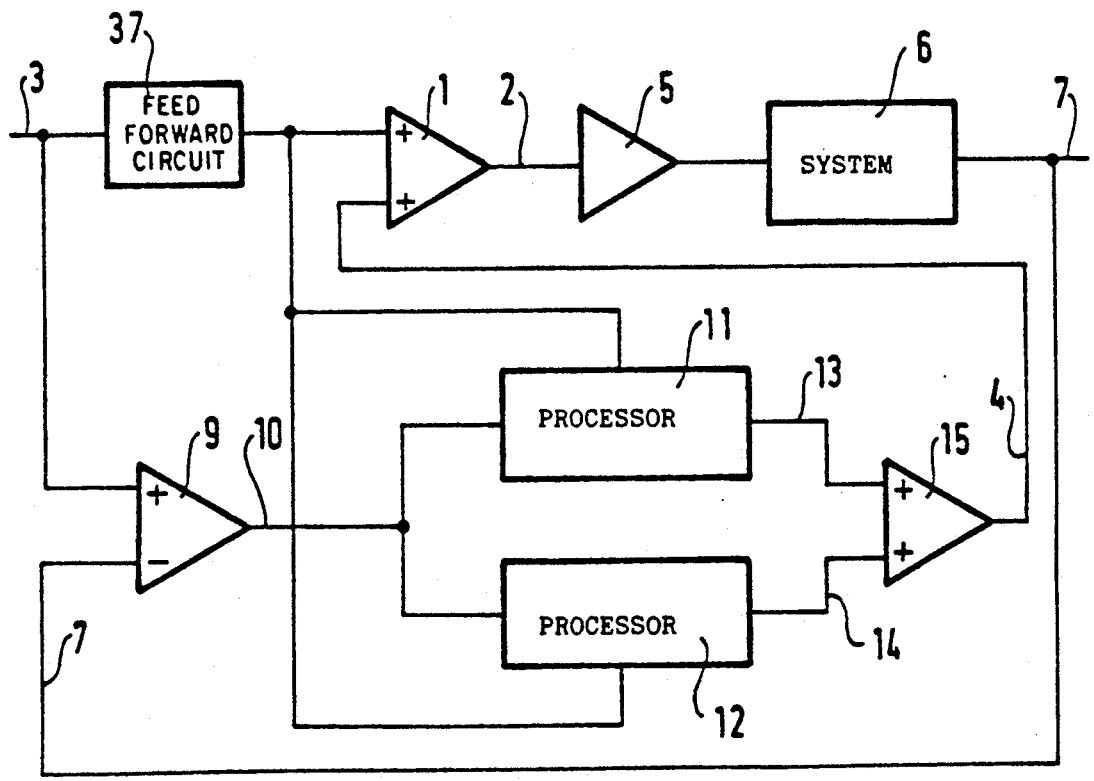
FIG. 10 shows a second embodiment of a feedback system control device.

In a second embodiment shown in FIG. 10, the output signal from the filter 37 is applied to the adder 1 as previously, but it is additionally applied to the input of the phase-shifters 16 of both processors 11, 12 in place of the input signal 3.

The filter 37 is a high-pass filter, for example, and eliminates unwanted DC or aperiodic components that may be present in the input signal 3 under transient conditions.

In the case of measuring the high-tension voltage of an electrical power distribution line by means of a capacitive divider, the output signal of the divider constitutes the input signal 3 of the control device and may include such unwanted components. The line has a very high time constant when it is open-circuit, especially after a circuit-breaker trips out. If the device is re-engaged in a time which is short in relation to this time constant, the capacitor of the capacitive divider, which receives a voltage equal to the high-tension voltage less the measurement voltage, will not be discharged and the output signal from this divider will be the sum of the measurement signal itself and a spurious signal with exponentially decreasing amplitude typical of the discharging of a capacitor.

The filter 37 enables this spurious signal and all its attendant disadvantages to be eliminated.

There is claimed:

1. Feedback system control device for controlling a feedback system, said control device comprising an adder adapted to produce a control signal from a feed forward signal and a correction signal, a system for processing said control signal and driving said feedback system which is adapted to produce an output signal, an error amplifier adapted to process the difference betwen an input signal and said output signal and to produce an error signal, a four-pole network adapted to receive said input signal and to produce said feed forward signal, a corrector adapted to produce said correction signal from said error signal, said corrector comprising two processors each adapted to receive said error signal and to produce respective modification signals between which there is a relative phase shift, and a summing circuit adapted to sum said modification signals to produce said correction signal.

2. Device according to claim 1 wherein said four-pole network delivers a feed forward signal identical to said input signal.

3. Device according to claim 1 wherein said four-pole network is a high-pass filter.

4. Device according to claim 3 wherein said corrector comprises a selective amplifier following said error amplifier to produce an error signal, followed by said two processors.

5. A device according to claim 1, wherein said adder and said summing circuit are included in a single circuit having three inputs.

6. Device according to claim 3 wherien at least one of said processors includes a phase-shifter which receives said feed forward signal and produces a phase-shifted signal, an error extractor which receives said phase-shifted signal and said error signal and produces an extraction signal followed by an amplifier receiving said extraction signal followed by a multiplier forming the product of said phase-shifted signal and said output signal of said amplifier and supplying said modification signal.

7. Device according to claim 3 wherein at least one of said processors includes a phase-shifter which receives said input signal and produces a phase-shifted signal, an error extractor which receives said phase-shifted signal and said error signal and produces an extraction signal and an amplifier receiving said extraction signal followed by a multiplier producing the product of said phase-shifted signal and the output signal of said amplifier and supplying the modification signal.

8. Device according to claim 7 wherein said error extractor is an analog multiplier, said extraction signal being the product of said phase-shifted signal and said error signal.

9. Device according to claim 7 wherein said error extractor comprises a signal shaper which receives said phase-shifted signal to produce a squarewave signal and a synchronous detector whose logic input is said squarewave signal and whose analog input is said error signal from which said extraction signal is produced.

10. Device according to claim 7 wherein said amplifier of at least one processor is an integrator.

11. Device according to claim 7 wherein said amplifier of at least one processor comprises a low-pass filter followed by an amplifier.

12. Device according to claim 6 wherein said multiplier comprises a chopper and a low-pass filter.

13. Device according to claim 1 wherein both processors include a phase-shifter, the phase shifts generated by said two phase-shifters being different.

14. Device according to claim 1 wherein one processor has no phase-shifter and the other applies a phase-shift of 90°.

15. A controlled system comprising a feedback system and a feedback system control device, said feedback system comprising an amplifier to be controlled and said feedback system control device comprising an adder adapted to produce a control signal from a feed forward signal and a correction signal, a system for processing said control signal and driving said feedback system which is adapted to produce an output signal, an error amplifier adapted to process the difference between an input signal and said output signal and to produce an error signal, a four-pole network adapted to receive said input signal and to produce said feed forward signal, a corrector adapted to produce said correction signal from said error signal, said corrector comprising two processors each adapted to receive said error signal and to produce respective modification signals between which there is a relative phase shift, and a summing circuit adapted to sum said modification signals to produce said correction signal.

16. A controlled system comprising a feedback system and a feedback system control device, said feedback system comprising a servo-actuator to be controlled and said feedback system control device comprising an adder adapted to produce a control signal from a feed forward signal and a correction signal, a system for processing said control signal and driving said feedback system which is adapted to produce an output signal, an error amplifier adapted to process the difference between an input signal and said output signal and to produce an error signal, a four-pole network adapted to receive said input signal and to produce said feed forward signal, a corrector adapted to produce said correction signal from said error signal, said corrector comprising two processors each adapted to receive said error signal and to produce respective modification signals between which there is a relative phase shift, and a summing circuit adapted to sum said modification signals to produce said correction signal.

* * * * *